US012677794B2

(12) United States Patent
Ghirardini et al.

(10) Patent No.: US 12,677,794 B2
(45) Date of Patent: Jul. 14, 2026

(54) MILK LINER

(71) Applicant: milkrite | InterPuls, Inc., Johnson Creek, WI (US)

(72) Inventors: Alessandro Ghirardini, Albinea (IT); Andrea Garimberti, Albinea (IT); Stefano Ferri, Albinea (IT)

(73) Assignee: MILKRITE | INTERPULS, INC., Johnson Creek, WI (US)

( * ) Notice: Subject to any disclaimer, the term of this patent is extended or adjusted under 35 U.S.C. 154(b) by 137 days.

(21) Appl. No.: 18/042,183

(22) PCT Filed: May 17, 2021

(86) PCT No.: PCT/EP2021/063028
§ 371 (c)(1),
(2) Date: Feb. 17, 2023

(87) PCT Pub. No.: WO2022/037811
PCT Pub. Date: Feb. 24, 2022

(65) Prior Publication Data
US 2024/0008441 A1 Jan. 11, 2024

(30) Foreign Application Priority Data
Aug. 20, 2020 (GB) ..................................... 2013022

(51) Int. Cl.
A01J 5/08 (2006.01)

(52) U.S. Cl.
CPC ...................................... A01J 5/08 (2013.01)

(58) Field of Classification Search
CPC ........................................................ A01J 5/08
(Continued)

(56) References Cited

U.S. PATENT DOCUMENTS

| | | | | | |
|---|---|---|---|---|---|
| 1,004,279 A | * | 9/1911 | Klein | ......................... | A01J 5/08 |
| | | | | | 119/14.16 |
| 1,285,079 A | * | 11/1918 | Eklundh | ................... | A01J 5/08 |
| | | | | | 119/14.52 |

(Continued)

FOREIGN PATENT DOCUMENTS

| | | | | |
|---|---|---|---|---|
| DE | 19811534 A1 | * | 9/1999 | ............... A01J 5/08 |
| EP | 1570729 A1 | | 9/2005 | |

(Continued)

OTHER PUBLICATIONS

Russian Patent Office, Official Action re Corresponding Application No. 2023105732, dated Dec. 4, 2024, 7 pages, Moscow, Russia.

(Continued)

*Primary Examiner* — David J Parsley
*Assistant Examiner* — Angelica Alejandra Almeida Bonnin
(74) *Attorney, Agent, or Firm* — McGarry Bair PC

(57) ABSTRACT

A milk liner of a milking apparatus has a resiliently deformable sleeve extending between a mouthpiece and an outlet pipe. The sleeve forms a cavity for receiving a teat of an animal to be milked. The sleeve incudes a first portion having a plurality of ribs, where the ribs extend longitudinally along and transversally outward from the first portion. The longitudinal extent of each rib terminates at a proximal end of the first portion. The transversal extent of each rib terminates in a flange for engaging with a shell. A second portion is located between a proximal end of the first portion and the outlet pipe. Both portions are configured to sequentially and progressively collapse inwards, where the progressive inward collapse is directed towards the distal end of the sleeve when a pressure difference is within a predetermined range, resulting in a peristaltic massage directed upward of the teat.

15 Claims, 10 Drawing Sheets

(58) Field of Classification Search
USPC ...................................................... 119/14.01
See application file for complete search history.

(56) References Cited

U.S. PATENT DOCUMENTS

| | | | | |
|---|---|---|---|---|
| 2,621,626 A * | 12/1952 | Harris | ........................ | A01J 5/08 |
| | | | | 119/14.53 |
| 2,853,971 A * | 9/1958 | Bajema | ..................... | A01J 5/08 |
| | | | | 119/14.49 |
| 2,997,980 A * | 8/1961 | Noorlander | ............... | A01J 5/08 |
| | | | | 119/14.49 |
| 3,234,906 A * | 2/1966 | Jensen | ..................... | A01J 5/06 |
| | | | | 119/14.32 |
| 3,289,634 A * | 12/1966 | Simons | ..................... | A01J 5/08 |
| | | | | 119/14.52 |
| 3,874,338 A * | 4/1975 | Happel | ..................... | A01J 5/08 |
| | | | | 119/14.53 |
| 5,224,442 A * | 7/1993 | Davies | ..................... | A01J 5/08 |
| | | | | 119/14.47 |
| 5,482,004 A | 1/1996 | Chowdhury | | |
| 5,493,995 A * | 2/1996 | Chowdhury | ............. | A01J 5/08 |
| | | | | 119/14.47 |
| 5,666,904 A * | 9/1997 | Grindal | ..................... | A01J 5/08 |
| | | | | 119/14.49 |
| 6,427,624 B1 | 8/2002 | Briggs et al. | | |
| 6,776,120 B1 * | 8/2004 | Chowdhury | ............. | A01J 5/08 |
| | | | | 119/14.47 |
| 6,796,272 B1 * | 9/2004 | Chowdhury | ............. | A01J 5/08 |
| | | | | 119/14.47 |
| 6,997,136 B1 * | 2/2006 | Coates | ..................... | A01J 5/08 |
| | | | | 119/14.47 |
| 7,401,573 B2 * | 7/2008 | Torgerson | ................. | A01J 7/04 |
| | | | | 119/14.47 |
| 7,578,260 B2 * | 8/2009 | Shin | .......................... | A01J 5/08 |
| | | | | 119/14.47 |
| 8,001,928 B2 * | 8/2011 | Boast | ........................ | A01J 5/08 |
| | | | | 119/14.47 |
| 8,302,561 B2 * | 11/2012 | Laney | ....................... | A01J 5/08 |
| | | | | 119/14.47 |
| 8,627,785 B2 * | 1/2014 | Grace | ....................... | A01J 5/08 |
| | | | | 119/14.47 |
| 9,408,367 B2 * | 8/2016 | Alveby | ..................... | A01J 5/08 |
| 10,785,952 B2 * | 9/2020 | Hedlund | ................... | A01J 5/08 |
| 2006/0005772 A1 * | 1/2006 | Shin | .......................... | A01J 5/08 |
| | | | | 119/14.52 |
| 2006/0196429 A1 * | 9/2006 | Boast | ........................ | A01J 5/08 |
| | | | | 119/14.47 |
| 2008/0072826 A1 * | 3/2008 | Happel | ..................... | A01J 5/08 |
| | | | | 119/14.49 |
| 2012/0012061 A1 * | 1/2012 | Chowdhury | ............. | A01J 7/00 |
| | | | | 119/14.51 |
| 2014/0123903 A1 * | 5/2014 | Priest | ........................ | A01J 5/08 |
| | | | | 119/14.47 |
| 2015/0040830 A1 * | 2/2015 | van Leeuwen | ........... | A01J 5/08 |
| | | | | 119/14.02 |
| 2016/0270361 A1 * | 9/2016 | Happel | ..................... | A01J 5/08 |
| 2017/0164575 A1 * | 6/2017 | Alveby | ..................... | A01J 5/08 |
| 2019/0124880 A1 * | 5/2019 | Samuelsson | ............. | A01J 5/16 |

FOREIGN PATENT DOCUMENTS

| | | | | |
|---|---|---|---|---|
| EP | 1902613 A1 | 3/2008 | | |
| EP | 3062608 B1 | 9/2016 | | |
| GB | 2107565 A * | 5/1983 | ............... | A01J 5/08 |
| RU | 2666366 C2 | 9/2018 | | |
| RU | 2718852 C1 | 4/2020 | | |
| SU | 1175402 A1 | 8/1985 | | |
| WO | 2015065274 A1 | 5/2015 | | |
| WO | 2017105321 A1 | 6/2017 | | |
| WO | 2021029784 A1 | 2/2021 | | |

OTHER PUBLICATIONS

Intellectual Property Office, Patents Act 1977: Search Report under Section 17 re Corresponding Application GB2013022.5 Jan. 27, 2021, 1 page.
Chinese Patent Office, Second Office Action re: Corresponding Application No. 202180051356.6, dated Sep. 3, 2024, 20 pages, China.
Russian Patent Office, Official Action re: Corresponding Application No. 2023105732, dated Sep. 27, 2024, 8 pages, Moscow, Russia.
Russian Patent Office, Search Report re Corresponding Application No. 2023105732, dated Sep. 24, 2024, 4 pages, Moscow, Russia.
Chinese Patent Office, Office Action re: Corresponding Application No. 202180051356.6, dated Apr. 10, 2024, 12 pages, China.
Russian Patent Office, Decision to Grant re Corresponding Application No. 2023105732 dated Jan. 20, 2025 and English translation, 19 pages, Moscow, Russia.
Chinese Patent Office, Decision of Rejection re Corresponding Application No. 2021800513566, dated Feb. 17, 2025 and machine-generated English translation, 21 pages, China.
Republic of Belarus Patent Office, Official Action with English translation re Corresponding Application No. a 20230073 E, dated Nov. 21, 2025, 8 pages, Minsk, Belarus.

* cited by examiner

MILK LINER

CROSS-REFERENCE TO RELATED APPLICATIONS

This application is a U.S. National Phase application of International Application No. PCT/EP2021/063028, filed May 17, 2021, which claims the benefit of Great Britain Application 2013022.5, filed Aug. 20, 2020, both of which are incorporated herein by reference in their entireties.

FIELD OF THE INVENTION

The present invention relates to a milk liner for use with a milking apparatus (i.e. an apparatus for removing milk from a teat of an animal, such as a cow, sheep, goat, horse, buffalo, or camel), and particularly, although not exclusively, to a milk liner configured to generate an improved massage of a teat of an animal to be milked and to increase milking speed. It also relates to a teat cup of a milking apparatus including the milk liner, a milking apparatus including the same, and a method of operating the milking apparatus.

BACKGROUND

In a conventional milking apparatus, a liner of resilient material is housed within a rigid outer body. The liner, which may be, for example, cylindrical or square, is typically mounted in a manner that causes it to be under tension along a longitudinal axis of the outer body, e.g. by stretching between attachment points at opposite longitudinal ends thereof. An animal teat is inserted through an opening in the outer body into the cylindrical liner. Suction is applied at the other end of the cylindrical liner to that in which the teat is inserted, to create a partial vacuum within the liner. This partial vacuum draws milk from the teat, but also causes congestion of teat tissues, arising from the accumulation of blood and other fluids. In order to relieve this congestion, a region between the outer body and the liner (typically referred to as the pulsation volume) is periodically switched between atmospheric pressure and a vacuum condition. When the region between the outer body and liner is at a higher pressure than the volume within the liner, the liner collapses around the teat, thereby providing relief from the suction.

There is a continuing need to improve the devices and methods for extracting milk from animals.

SUMMARY OF THE INVENTION

In general, the present invention provides a milk liner configured to effect a massage, in particular a peristaltic massage, of the teat of an animal to be milked. This peristaltic massage effect can be performed via two different mechanisms. Firstly, the milk liner can include a first "ribbed" portion and a second "unribbed" portion. The first portion has ribs extending longitudinally along and transversally outward from the first portion, and the second portion has no such ribs. The second and first portions are configured in use to sequentially collapse inwards to cause a peristaltic massage of the teat. Secondly, the milk liner can include a tapering portion configured in use to cause a progressive inward collapse of the milk liner, the progressive inward collapse being directed up the teat to cause a peristaltic massage of the teat. When a conventional liner collapses around the teat, this can cause pinching of the teat end. Furthermore, since the conventional liner collapses simultaneously across the entire teat, the amount by which fluids can be redistributed up the teat is less than optimal. An improved massage as per the present invention could therefore further reduce the accumulation of fluids in the teat, reducing congestion and stress on the teat tissue and the animal, and improving milking speed.

According to a first aspect of the invention, there may be provided a milk liner for use in a shell of a milking apparatus. The milk liner comprises a resiliently deformable sleeve extending between a mouthpiece at a distal end and an outlet pipe at a proximal end. The sleeve forms a cavity for receiving a teat of an animal to be milked. The sleeve comprises a first portion having a plurality of ribs, the ribs extending longitudinally along and transversally outward from the first portion. The longitudinal extent of each rib terminates at or before a proximal end of the first portion. The outer end or transversal extent of each rib terminates in a flange for engaging with the shell. The sleeve further comprises a second portion located between a proximal end of the first portion and the outlet pipe. The second and first portions are configured to sequentially collapse inwards when a pressure difference within a predetermined range (or predetermined operation range) is present across a wall of the sleeve, so as to cause a peristaltic massage of the teat.

The varying levels of outward or transverse or cross tension between the first portion (supported by ribs) and the second portion (not supported by ribs) leads to a sequential collapse of the sections to deliver the massage.

A peristaltic massage of this type, which is directed up the teat and towards the animal, can improve circulation in the teat during milking compared to a liner which collapses simultaneously across the entire teat. This improved massage therefore reduces the accumulation of fluids in the teat, reducing congestion and stress on the teat tissue and the animal, and improving milking speed. Furthermore, by collapsing up and onto the teat, the liner can also ensure a better fit with the teat, reducing pinching on the teat end. The ribbed and unribbed portions enable this to be achieved even if the sleeve has a constant (rather than tapering) cross-sectional area.

The pressure difference required to cause the collapse may be, for example, between about 10 and 60 kPa (or between about 15 and 35 kPa). It is to be understood that a pressure difference below the predetermined range may be insufficiently large to cause a sequential inward collapse of the sleeve that effects a peristaltic massage, whereas a pressure difference above the predetermined range may be so large that the sleeve collapses all at once (i.e. in a non-sequential manner) such that no peristaltic massage is effected. Additionally, it is to be understood that the values of the predetermined range will vary between liner embodiments, and depend on factors such as the liner's material, construction, and dimensions. By reducing congestion in the teat that can otherwise arise from accumulated fluids at the teat end, milking speed can also be improved.

An outward or transversal extent of each rib may increase towards the proximal end of the first portion. Additionally or alternatively, a width of each rib may decrease towards the proximal end of the first portion. Either of these configurations of rib, which may be employed singly or in combination, causes a progressive decrease in the outward support generated by the rib. This can therefore enable or enhance a sequential or progressive nature of the collapse and hence the peristaltic massage generated by the sleeve.

The flange of each rib may be T-shaped, which can provide a reliable contact with the shell of the milking apparatus.

The first portion and/or the second portion of the sleeve may have a triangular cross sectional shape. A triangular cross-section for a milk liner provides a number of benefits compared to, for example, a circular cross section. It can reduce the amount by which the liner may collapse or pinch onto the teat and teat end, and thereby reduce stress on the teat tissue. Reducing pinching also reduces the risk of hyperkeratosis. It can also allow space for channels close to the vertices of the liner which remain open throughout milking for improved air flow within the milk liner.

The first portion and/or the second portion may taper towards its proximal end. For example, at least one of an internal cross sectional area and an external cross sectional area of the first portion and/or the second portion gradually reduces towards its proximal end.

The liner may comprise three ribs, with each of the ribs extending transversally outward from a different vertex of the first portion.

The sleeve may have a distal wall portion with a first wall thickness and a proximal wall portion with a second wall thickness different than the first wall thickness, the wall thickness undergoing a step change at an interface between the distal wall portion and the proximal wall portion. The distal wall portion may have a constant or substantially constant wall thickness. The proximal wall portion may have a constant or substantially constant wall thickness. The interface may be located within the first portion and in a proximal end region of the first portion. For example, the interface may be located adjacent or close to the junction between the first and second portions. The first wall thickness may be less than the second wall thickness. An increase in wall thickness for the second portion can partially compensate for the lack of support from ribs at a proximal end of the sleeve. Therefore, while the second portion may more readily collapse than the first portion to generate the sequential and peristaltic massage, it can be prevented from collapsing too readily. Alternatively, the first wall thickness may be greater than the second wall thickness, with a decrease in wall thickness further ensuring that the second portion collapses more readily than the first portion. Providing an interface that is differently located to an end of the ribs can assist in smoothing the transition between the first and second portions in terms of elastic properties.

A cross sectional shape of the outlet pipe may be different to the cross sectional shape of the second portion, and the sleeve may further comprise an outlet transition portion located between a proximal end of the second portion and the outlet pipe, the outlet transition portion having a gradual transition of cross sectional shape between the cross sectional shape of the second portion and the cross sectional shape of the outlet pipe. The cross sectional shape of the outlet pipe may be circular. This ensures a smooth transition between the shapes of the milking cavity and the outlet pipe, ensuring consistent flow of milk to the outlet pipe.

A cross sectional shape of the mouthpiece may be different to the cross sectional shape of the first portion, and the sleeve may further comprise a mouthpiece transition portion located between the mouthpiece and the distal end of the first portion, the mouthpiece transition portion having a gradual transition of cross sectional shape between the cross sectional shape of the mouthpiece and the cross sectional shape of the first portion. The optimal shape for the mouthpiece may be different from that of the sleeve. Having a smooth transition portion between the two ensures a reliable fit between the milk liner and the teat, and avoids sharp transitions in internal shape that could either place stresses on the teat or make cleaning of the liner more challenging. In some embodiments, the cross sectional shape of the mouthpiece may be circular, which can allow better fitting to the teat of the animal to be milked. The mouthpiece transition portion can therefore also function as a guide for the teat to ensure it correctly enters the first portion of the sleeve.

The mouthpiece transition portion may also define an expansion volume into which the teat may expand while undergoing the peristaltic massage. In other words, the volume defined by the mouthpiece transition portion may create a space or void around an upper portion of the teat. When the teat is massaged during milking, it may be pushed up and into this expansion volume. This can reduce the level of constriction on the teat, which can enable a higher milking speed or milking rate.

An internal cross sectional area of the mouthpiece transition portion may taper towards the proximal end of the sleeve. This can further enable the mouthpiece and any expansion volume defined by the mouthpiece transition portion to be increased, while still enabling a smooth transition between the different portions of the sleeve. A smooth transition may be preferable for increased ease of cleaning and improved guiding of the teat between the different portions, for example, since no ridges or other projecting or recessed features are created on the sidewall of the milk liner.

According to a second aspect of the invention, there is provided a milk liner for use in a shell of a milking apparatus. The milk liner comprises a resiliently deformable sleeve extending between a mouthpiece at a distal end and an outlet pipe at a proximal end, the sleeve forming a cavity for receiving a teat of an animal to be milked. The sleeve comprises a tapering portion configured to cause a progressive inward collapse of the sleeve when a pressure difference within a predetermined range (or predetermined operation range) is present across a wall of the sleeve, the progressive inward collapse being directed towards the distal end of the sleeve so as to cause a peristaltic massage of the teat.

As with the first aspect of the invention, this provides a milk liner which can deliver an improved massage of the teat, increasing milking efficiency and speed and reducing stress on the animal.

The pressure difference required to cause the collapse may be, for example, between about 10 kPa and 60 kPa (or between about 15 and 35 kPa). It is to be understood that a pressure difference below the predetermined range may be insufficiently large to cause a progressive inward collapse of the sleeve that effects a peristaltic massage, whereas a pressure difference above the predetermined range may be so large that the sleeve collapses all at once (i.e. in a non-progressive manner) such that no peristaltic massage is effected. Additionally, it is to be understood that the values of the predetermined range will vary between liner embodiments, and depend on factors such as the liner's material, construction, and dimensions. By reducing congestion in the teat that can otherwise arise from accumulated fluids at the teat end, milking speed can also be improved.

The tapering portion may be configured such that an internal cross sectional area of the tapering portion of the sleeve gradually reduces towards the proximal end of the tapering section.

The tapering portion may be configured such that an external cross sectional area of the tapering portion of the sleeve gradually reduces towards the proximal end of the tapering section.

The rate of taper of the tapering portion can influence the peristaltic massage generated by the milk liner (for example the rate of massage or the extent of collapse). The rate of taper is affected by the rates of taper of the internal and external cross sections of the sleeve.

The tapering portion may be configured such that a wall thickness of the tapering portion of the sleeve remains constant or substantially constant. Providing a tapering portion with a constant wall thickness can ensure a predictable and constant rate of collapse during the peristaltic massage.

The tapering portion of the sleeve may have a triangular cross sectional shape. The advantageous effects of a triangular cross section are as discussed in view of the first aspect of the invention.

The milk liner may further comprise a plurality of ribs extending longitudinally along and outwardly or transversally outward from the tapering portion of the sleeve, the outer end or transversal extent of each rib terminating in a flange for engaging with the shell. By engaging with the shell, the ribs may provide support to resist or lessen the collapse of the sleeve by exerting a transverse or outwards tension on the sleeve. This can enable, for example, a liner with a thinner wall thickness to have improved flexibility, without causing excessive collapse or pinching onto a received teat. Thinner walls may, for example, collapse more quickly, or respond more readily to smaller changes in pressure across them. The number and location of the ribs around the sleeve can thereby influence the collapsed shape of the sleeve.

An outward or transversal extent of each rib may increase towards the proximal end of the tapering portion. A width of each rib may decrease towards the proximal end of the tapering portion. Either of these configurations of rib, which may be employed singly or in combination, causes a progressive decrease in the outward support generated by the rib, which can assist or enhance the peristaltic massage generated by the sleeve.

The flange of each rib may be T-shaped. A T-shaped flange, wherein the rib terminates in a cross-piece with flanges extending to both sides of the rib, ensures effective contact between the flange and the shell.

The liner may comprise three ribs, and each of the ribs may extend transversally outward from a vertex of the tapering portion. This can ensure that the liner will collapse to a triangular cross section.

Each of the plurality of ribs may have a longitudinal extent that terminates at the proximal end of the tapering portion. The sleeve may further comprises an unribbed portion (i.e. a portion of sleeve that is not supported by ribs) located between the proximal end of the tapering portion and the outlet pipe. By having a portion that is not supported by ribs, the transverse or outwards tension on the sleeve differs between the ribbed and unribbed portions. This can ensure that the unribbed portion collapses first when the pressure difference is applied across the sleeve. The unribbed portion may thereby initiate the collapse of the sleeve and hence the peristaltic massage of the teat.

The unribbed portion may have the same cross sectional shape as the tapering portion.

The unribbed portion may taper towards the proximal end of the sleeve. For example, the internal and/or external cross-sectional area of the unribbed portion may gradually reduce towards the proximal end of the sleeve.

The unribbed portion may taper at an equal rate to the tapering portion.

The choice of tapering rates, and in particular of relative tapering rates between the tapering portion and the unribbed portion can influence and affect the peristaltic massage delivered by the milk liner.

The sleeve may have a distal wall portion with a first wall thickness and a proximal wall portion with a second wall thickness different to the first wall thickness, the wall thickness undergoing a step change at an interface between the distal wall portion and the proximal wall portion. The distal wall portion may have a constant or substantially constant wall thickness. The proximal wall portion may have a constant or substantially constant wall thickness. This change in wall thickness at the interface can further influence the collapse of the sleeve and the resultant peristaltic massage. For example, it may be desirable for the wall to be thicker in the unribbed portion to prevent a premature collapse of the sleeve. In other words, it may be preferable to compensate partially for the reduction in transverse or outward tension on the sleeve resulting from the absence of ribs on the unribbed portion, while still retaining the requisite properties of the unribbed portion which enable it to initiate the progressive collapse. Conversely, it may be desirable for the wall to be thinner in the unribbed portion to further ensure that the collapse begins in the unribbed portion. The interface may be located within the tapering portion and in a proximal end region of the tapering portion. For example, the interface may be located adjacent or close to the junction between the tapering portion and the unribbed portion. This can ensure that the unribbed portion is adequately supported, while not requiring a simultaneous step change in wall thickness and end of the ribs. In an embodiment, the distal wall portion may have a first wall thickness of about 1.5 mm and the proximal wall portion may have a second wall thickness of about 1.8 mm.

A cross sectional shape of the outlet pipe may be different to the cross sectional shape of the unribbed portion, and the sleeve may further comprise an outlet transition portion located between the proximal end of the unribbed portion and the outlet pipe, the outlet transition portion having a gradual transition of cross sectional shape between the cross sectional shape of the unribbed portion and the cross sectional shape of the outlet pipe. The advantageous effects of this configuration are as discussed in view of the first aspect of the invention. In some embodiments, the cross sectional shape of the outlet pipe may be circular.

A cross sectional shape of the mouthpiece may be different to the cross sectional shape of the tapering portion, and the sleeve may further comprise a mouthpiece transition portion located between the mouthpiece and a distal end of the tapering portion, the outlet transition portion having a gradual transition of cross sectional shape between the cross sectional shape of the mouthpiece and the cross sectional shape of the tapering portion. The cross sectional shape of the mouthpiece may be circular. The mouthpiece transition portion may define an expansion volume into which the teat may expand while undergoing the peristaltic massage. An internal cross sectional area of the mouthpiece transition portion may taper towards the proximal end of the sleeve. These features and configurations have also been discussed in view of the first aspect of the invention, and the advantageous effects apply equally here.

The following optional features can be included or applied to embodiments according to either the first or second aspects of the invention.

The milk liner may comprise a vent located in a sidewall of the mouthpiece or mouthpiece transition portion for admitting ambient air into the cavity of the sleeve. By allowing a flow of air into a distal part of the cavity, the vent enables a number of advantages. For example, the air coming from the vent can push the milk away from the teat and reduce respray risk. Respray occurs when milk is not all extracted via the outlet, but instead is rebounded or resprayed back onto the teat. This not only reduces the efficiency of milking (since milk remains in the liner rather than being collected), but can also lead to cross-contamination between animals (if milk residue remains inside the liner), disease or conditions such as mastitis, or require more extensive cleaning. Ensuring that the teat remains dry during milking can also reduce stress on the animal and on the teat tissue. A wet teat during milking can cause the milk liner to slip on the teat, which can cause lesions or blistering, or more generally reduce the milking efficiency. Where the sleeve of the milk liner has a triangular cross section, the collapse is such that channels are left along the sleeve at the vertices of the triangle. Air can thereby flow from the mouthpiece vent and along the sleeve to assist in pushing milk towards the outlet.

The liner may be formed as a unitary component. In an environment where sterility may be important, forming the liner as a single object rather than as a set of assembled components can ensure that there are no interface portions such as gaps or seams between components which can harbour contamination, residues, dirt, or microbes.

The liner may also be formed as a plurality of components. These components, which may include a plurality of sleeve segments, may be joined together by gluing or welding, or held together by cooperating components such as pins and slots. Assembly may be completed as a stage of manufacture, or immediately prior to usage. This may allow, for example, improved configurability of the liner to meet the specific requirements of the animal to be milked.

The liner or liner components may be moulded. The liner could be formed from a polymeric material. This material could be a rubber, such as a synthetic rubber, a thermoplastic, or a silicone, and in general is an elastic or resiliently deformable material. Designing the milk liner to be manufactured in this way ensures a simple and consistent means for manufacturing.

The shell may be cup-shaped, and the mouthpiece may comprise a skirt configured to overlap and hold a rim of the shell. The skirt may instead be a pocket which extends fully or partially around a circumference of the mouthpiece to receive a rim of the shell. This therefore provides a mounting point at a distal end of the milk liner to a distal end of the shell, enabling the shell and liner to be assembled together.

The outlet pipe may comprise an outwardly extending flange for engaging with a base of the shell at a proximal end of the shell. This can be used to lock the outlet pipe in place through the base of the shell, ensuring that the liner is correctly positioned and held or supported by the shell.

According to a third aspect of the invention, there is provided a teat cup of a milking apparatus, the teat cup comprising a cup-shaped shell and a milk liner according to the first or second aspects of the invention. The milk liner is mounted in and to the shell so as to define an air-tight chamber between the milk liner and the shell. The shell comprises a vent in fluid communication with the chamber. The vent is used to introduce or remove air from the chamber, and in particular to do so periodically or cyclically, thereby generating the required pressure difference (i.e. a pressure difference within the predetermined range) across the wall of the sleeve to produce the peristaltic massage.

The milk liner may be mounted to each of a rim of the shell (at its distal end) and a base of the shell (at its proximal end), and the shell may be sized to impose a longitudinal stretch on the mounted milk liner. A longitudinal stretch of the shell can ensure that the sleeve of the liner will rapidly and reliably return or rebound to a relaxed and non-collapsed configuration when the pressure difference is removed. A slow opening of the liner to its relaxed position can lead to greater average constricting forces on the teat, which can stress the teat tissue and/or slow the milking rate. The stretching may also reduce the force generated by the collapsing liner on the teat, enabling greater control over the different parameters influencing collapse. As an example, this can enable a higher pressure difference to be used for more rapid massage without leading to a corresponding increase in compression force on the teat. This is because any collapse of the sleeve of the liner requires stretching of the liner wall, and the longitudinal stretch therefore leads to an outward or transverse force.

A longitudinal strain in the milk liner introduced by the longitudinal stretch (or, in other words, the additional length of the stretched liner compared to the unstretched liner) may be greater than 10%, preferably greater than 12% and more preferably greater than 15%. The longitudinal stretch may be less than 30%, preferably less than 25% and more preferably less than 20%. A higher stretch can lead to more rapid opening from a collapsed state, which may be advantageous. Conversely, if the stretch is too great, the ability of the liner to collapse may be compromised or affected. Furthermore, a larger or longer stretch may lead to excessive strain on the milk liner, which could lead to premature failure, and/or make the liner more difficult to locate in the shell when assembling the teat cup.

In a teat cup wherein the sleeve of the milk liner comprises a plurality of transversally outward extending ribs, the outer end or transversal extent of each rib terminating in a flange, the shell may comprise corresponding slots for receiving and engaging with the flanges. The interaction between the flanges and the slots can therefore provide a supporting outward or transverse force on the sleeve via the ribs. The shell and the slots may be located such that, at rest, no stretch is imposed by the ribs. In other words, the ribs are in a relaxed state when no pressure difference is applied across the sleeve. Alternatively, the slots of the shell may be spaced to impose a transverse stretch to the sleeve of the milk liner via the received ribs even when no pressure difference is applied. This can improve the reactivity of the liner, and in particular the opening of the liner when the pressure difference is removed.

A transverse strain in the milk liner introduced by the flanges engaging with the slots may be less than 50%, preferably less than 25% and more preferably less than 20%. As with the longitudinal stretch, a higher stretch can lead to more rapid opening from a collapsed state, while an excessive stretch can affect the liner collapse.

The teat cup may further comprise an auxiliary module mounted on the shell, the auxiliary module being configured to access the cavity of the sleeve. This auxiliary module may therefore be used to detect, monitor or control conditions inside the cavity, to improve quality of milking. For example, the auxiliary module may comprise a sensor for detecting a property of the cavity. The sensor may be a longitudinal array of probes configured to detect the property of the cavity along the length of the sleeve. Therefore, the conditions such as pressure, collapse force, temperature, or humidity may be monitored along the sleeve to detect equipment or animal issues during milking. The auxiliary module may comprise a camera for capturing an image of the cavity. This may be used, for example, to monitor animal health or milking progress.

The auxiliary module may comprise an auxiliary module vent controlled by a valve to fluidly connect the cavity and an environment outside the teat cup. The auxiliary module can be configured to operate the valve to selectively permit fluid communication via the vent. This provides an additional means to control the pressure inside the sleeve, for example to prevent an excessive vacuum on the teat or pressure difference across the sleeve.

The auxiliary module may comprise a fluid delivery mechanism for injecting or otherwise directing a sanitisation fluid (e.g. iodine) onto the teat, e.g. when the milking process is complete. This can therefore improve the animal hygiene as a part of the milking process.

A wall of the shell may narrow towards a proximal end of the shell. This can reduce the overall weight of the shell, preventing excessive force on the teat of the animal from the weight of the teat cup. Where a milking cluster, comprising multiple teat cups, is used, the excess force generated by a heavier set of shells can otherwise cause stress on the teat, or cause the liner and teat cup to slip down or off the teat during milking. This can lead to blistering or grazing of the teat, which may increase the likelihood of conditions such as mastitis.

According to a fourth aspect of the invention, there is provided a milking apparatus comprising a teat cup according to the third aspect of the invention, a suction source for applying a suction force to the outlet pipe of the milk liner, and a pressure source for applying a cyclically varying pressure to the vent of the shell. The milking apparatus may comprise a plurality of teat cups, which may be grouped as a milking cluster comprising a number of teat cups corresponding to the udder of the animal to be milked. The suction pressure applied to the outlet pipe may be, for example, a vacuum or suction pressure of 30-55 kPa, and may be varied as required for the specific animal or animal species being milked. Typical vacuum ranges for a cow are 40-44 kPa, for a buffalo are 44-50 kPa, and for a sheep or goat are 32-40 kPa. The cyclical pressure variation may be, for example, a step change between two pressure values (i.e. a square wave pressure profile), or a ramped change such as a sawtooth or sinusoidal wave. The two pressure values may be, for example, atmospheric pressure and a pressure approximately equal to the suction pressure. However, an elevated pressure may be used for the higher value (i.e. above atmospheric pressure) and a reduced pressure may be used for the lower value (i.e. a greater vacuum than the suction pressure).

According to a fifth aspect of the invention, there is provided a method of operating a milking apparatus according to the fourth aspect of the invention, comprising the steps of applying a suction force to the outlet pipe of the milk liner, and applying a cyclically varying pressure to the vent of the shell to cause a progressive and/or sequential collapse of the sleeve of the milk liner, the progressive and/or sequential collapse being directed towards the mouthpiece of the sleeve so as to cause a peristaltic massage of the teat. The cyclical pressure variation may be, for example, a step change between two pressure values (i.e. a square wave pressure profile), or a ramped change such as a sawtooth or sinusoidal wave.

The invention includes the combination of the aspects and preferred features described except where such a combination is clearly impermissible or expressly avoided.

SUMMARY OF THE FIGURES

Embodiments illustrating the principles of the invention will now be discussed with reference to the accompanying figures in which.

DETAILED DESCRIPTION OF THE INVENTION

Figure 1:
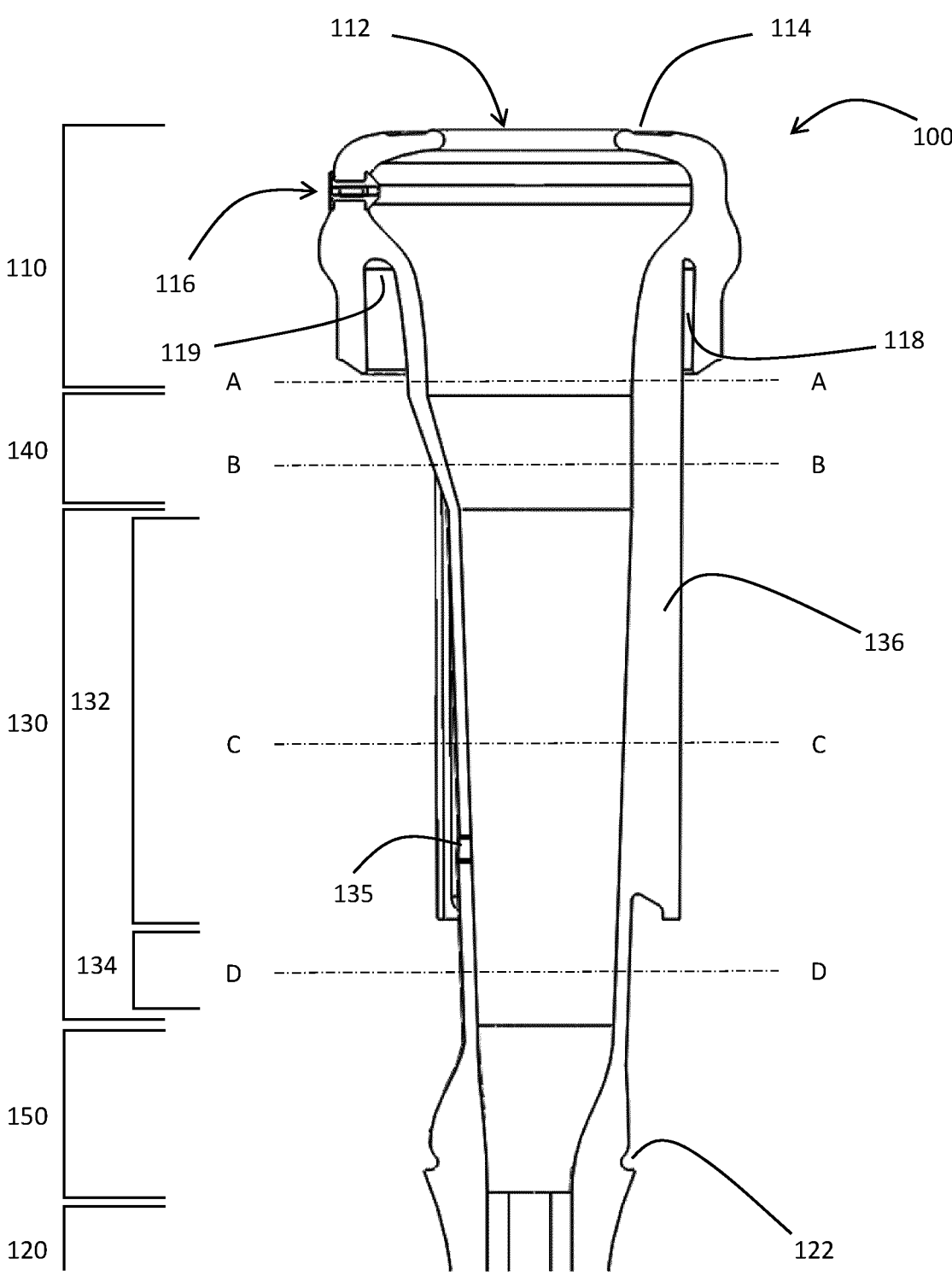
FIG. 1 illustrates a cross sectional view of a milk liner according to the present invention.
Figure 2:
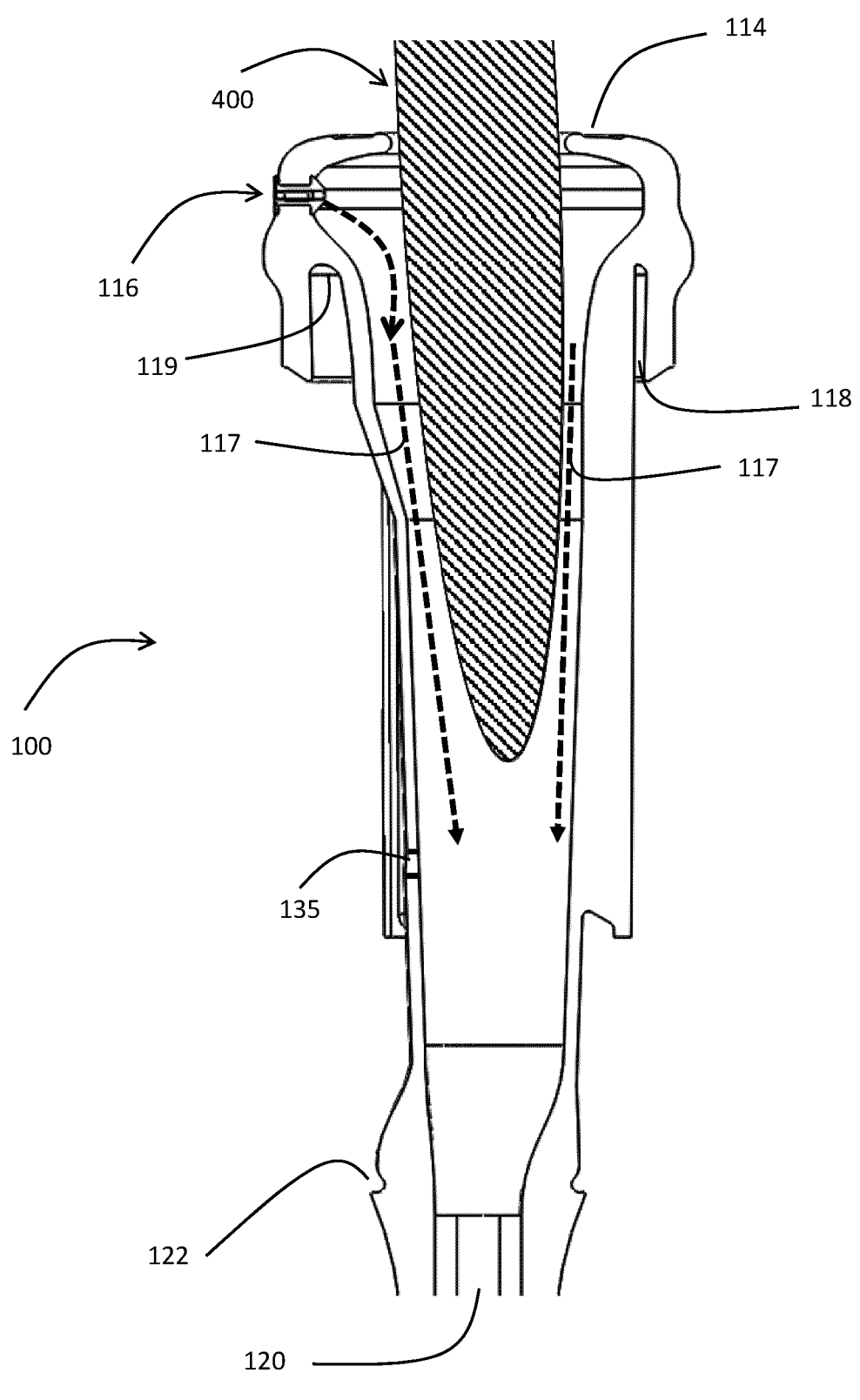
FIG. 2 illustrates a cross sectional view of the milk liner of FIG. 1, illustrating the effect of air flow from the mouthpiece vent.

Aspects and embodiments of the present invention will now be discussed with reference to the accompanying figures. Further aspects and embodiments will be apparent to those skilled in the art. All documents mentioned in this text are incorporated herein by reference.

An embodiment of a milk liner 100 according to the present invention is illustrated in FIGS. 1 to 10. The liner comprises a resiliently deformable sleeve 130 which extends between a mouthpiece 110 at a first, distal end of the liner 100 and an outlet pipe 120 at a second, proximal end of the liner 100. The sleeve 130 is connected to the mouthpiece 110 by a mouthpiece transition portion 140, and to the outlet pipe 120 by an outlet transition portion 150. The milk liner 100 can be mounted to a rigid shell 200 (shown in FIGS. 11-14) to form a teat cup for a milking apparatus. In use, a suction is applied to the outlet pipe 120 to extract milk from the teat 400 (shown in FIGS. 2 and 3). The suction pressure applied to the outlet pipe 120 may be, for example, a vacuum or suction pressure of 30-55 kPa, and may be varied as required for the specific animal or animal species being milked. A cycling or periodic pressure is applied to a space 230 (shown in FIGS. 13 and 14) between the shell 200 and the milk liner 100. In this way, the sleeve 130 periodically and progressively or sequentially collapses and retracts from the teat 400, generating a massaging effect on the teat 400 for improved milk delivery and reduced stress on the teat tissue and the animal to be milked. The progressive or sequential collapse of the sleeve 130 occurs when the pressure difference is within a predetermined operating range, which may be, for example 10 kPa to 60 kPa (or 15 kPa to 35 kPa). A pressure difference above this range may cause the sleeve to collapse all at once (i.e. not progressively or sequentially) such that no peristaltic massage is effected, whereas a pressure difference below this range may result in either no collapse or a collapse of insufficient magnitude to cause a massaging effect. The values of the predetermined operating range for an embodiment will depend on various features and characteristics of the milk liner, such as, for example, size, shape, dimensions, material composition, etc.

The minimum pressure difference required to cause the liner to collapse is termed the touch-point pressure (as defined in ISO 3918:2007, point 7.16), and is the pressure difference that causes the walls of the liner to touch when a static vacuum is applied to the outlet pipe 120 of the milk liner. The difference between the touch-point pressure and the suction pressure (i.e. the pressure difference over and above the touch-point pressure across the sleeve 130) is then indicative of the effective massage pressure on the teat 400 of the animal.

The mouthpiece 110 is configured or designed to receive the teat 400 of an animal to be milked, which might be, for example, a cow, sheep, goat, horse, buffalo, or camel. The mouthpiece comprises an aperture 112 through which the teat 400 can pass. The aperture 112 is configured to closely surround and abut the teat 400, such that an airtight or substantially airtight seal is formed between the mouthpiece 110 and the teat 400. In use, the milk liner 100 grips the teat 400 via this contact between the teat 400 and the mouthpiece 110, and a good contact is therefore desirable to avoid the milk liner 100 from slipping off the teat 400 during milking. In the illustrated embodiment, the internal cross sectional area of the mouthpiece 110 is larger than that of the aperture. The aperture 112 is therefore defined by a flange 114 which extends inwards from an outer edge or surface of the milk liner. In other embodiments, the mouthpiece may instead have the same size as the aperture, and may therefore continue directly from the aperture 112.

The mouthpiece 110 comprises a vent 116. The vent 116 allow air to enter the cavity around the teat 400, leading to an airflow from the distal end towards the proximal end of the liner 100 during milking. This is as indicated by the arrows 117 in FIG. 2. This airflow assists in directing milk away from the teat 400 and towards the outlet pipe 120. Therefore, vent 116 can reduce or prevent respray of milk from the outlet pipe 120 towards the teat 400. This can ensure, for example, that the teat 400 remains dry during milking, which can reduce the likelihood of cross-contamination between animals for improved hygiene. By ensuring that milk flows readily towards the outlet pipe 120 and is not resprayed into the milk liner 100, the speed and efficiency of milking are also improved. In other embodiments of the invention, the vent 116 may be omitted.

The mouthpiece 110 further comprises a circumferential pocket which is defined by a skirt 118 which is configured to receive, overlap and hold the rim 210 of a shell 200 of a teat cup. The skirt 118 extends fully around the perimeter or circumference of the mouthpiece 110. When the milk liner 100 and shell 200 are assembled, the skirt 118 forms an airtight seal with the rim 210 of the shell 200. Other mounting arrangements may also be used, provided that they fulfil the required functions of mounting the milk liner 100 to the shell 200, and forming an airtight seal between the two.

Figure 11:
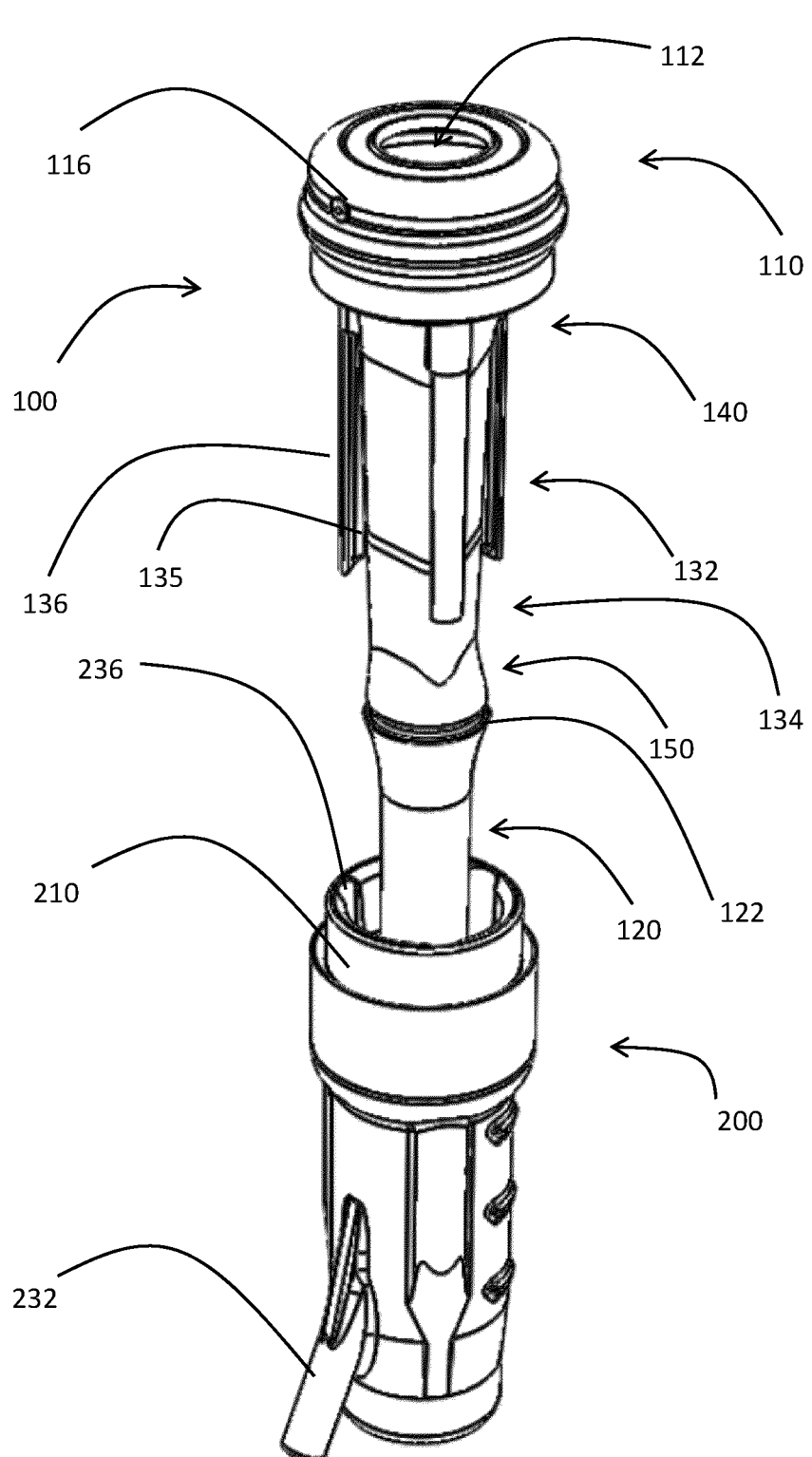
FIG. 11 shows a partially assembled teat cup.
Figure 12:
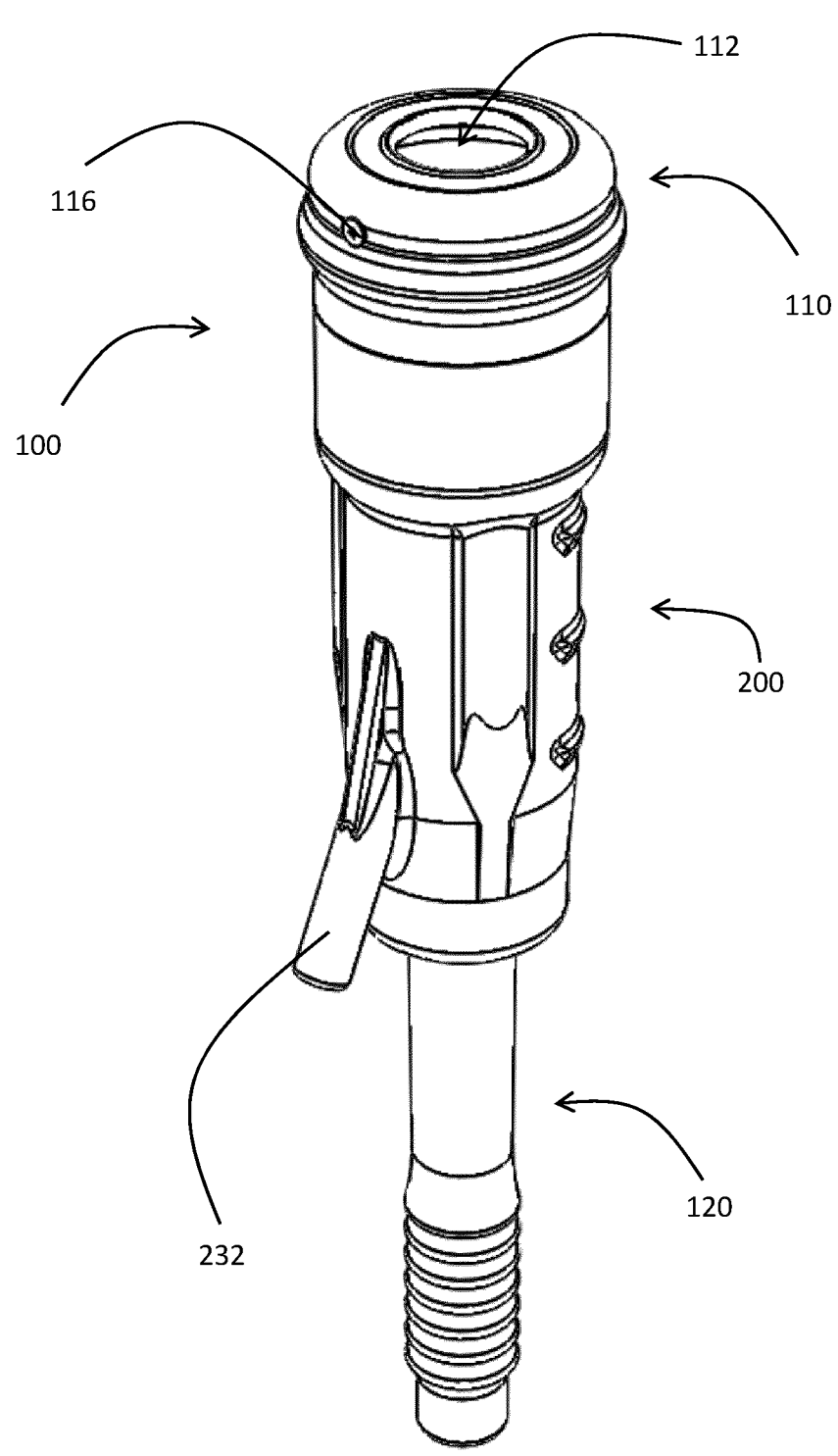
FIG. 12 shows an assembled teat cup.

The outlet pipe 120, which may also be referred to as a short milk tube is a pipe that is connectable to a source of suction. This may be, for example, the claw of a milking apparatus. A constant vacuum is applied to the outlet pipe 120, and milk from the teat 400 is drawn or sucked along the outlet pipe 120 by this suction. The outlet pipe 120 and/or the outlet transition portion 150 comprises a projection or flange 122 for engaging with a base of a shell 200 to form a teat cup, as illustrated in FIGS. 11 and 12. The flange 122 may take the form of a ring (e.g. a projection) extending around the outlet pipe 120. Alternatively, the flange 122 may be replaced with a slot (e.g. a recess). When the milk liner 100 and shell 200 are assembled, the flange 122 forms an airtight seal with the base of the shell 200.

Figure 3:
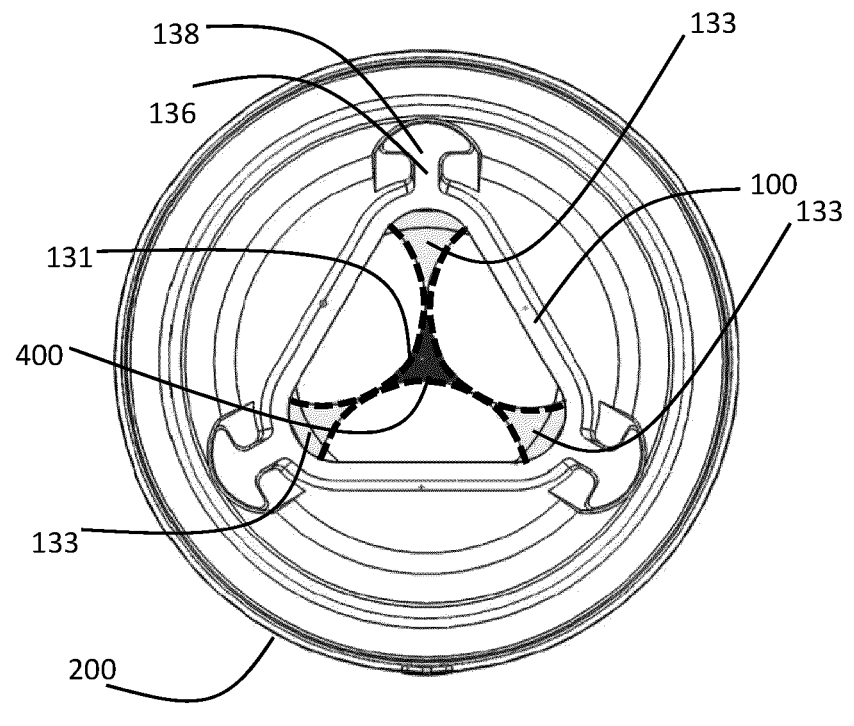
FIG. 3 illustrates a top-down view of the sleeve of the milk liner of FIG. 1, illustrating the collapse of a triangular liner.
Figure 6:
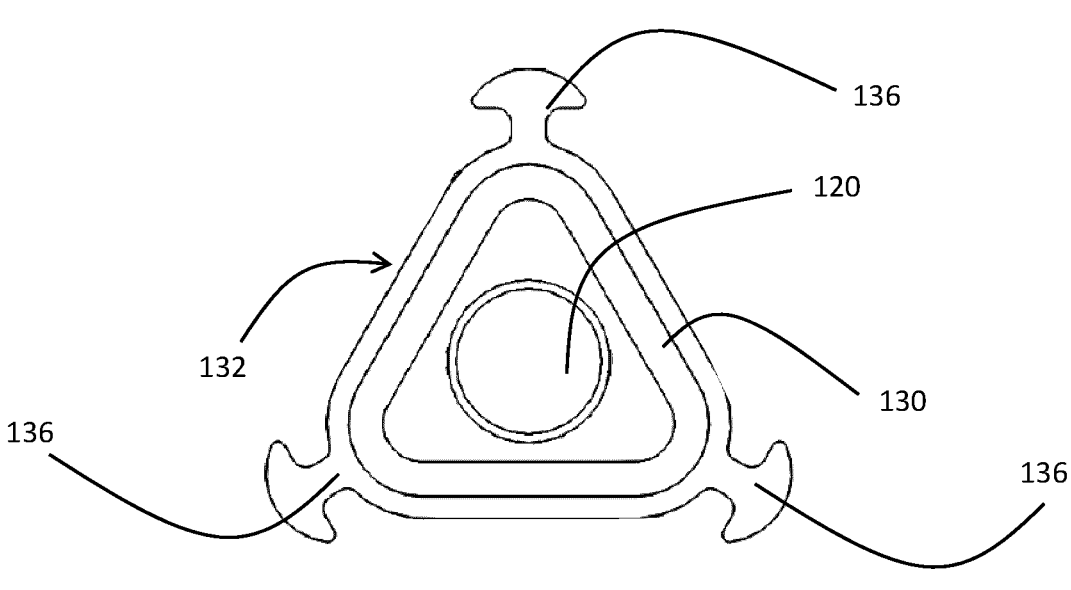
FIG. 6 illustrates a top down view of the first portion of the sleeve of the milk liner, along line C-C of FIG. 1.
Figure 7:
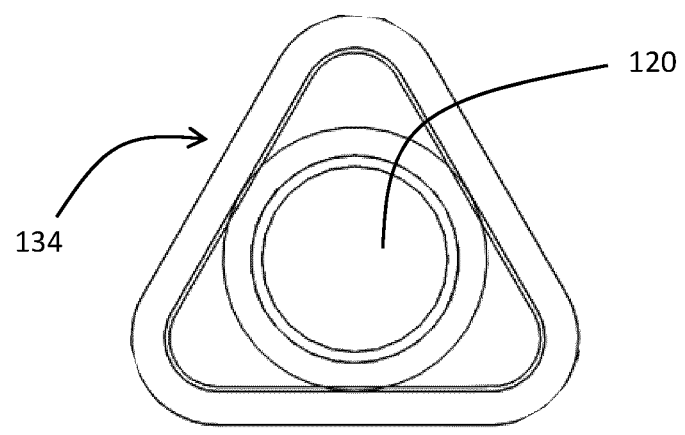
FIG. 7 illustrates a top down view of the second portion of the sleeve of the milk liner, along line D-D of FIG. 1.

The sleeve 130 of the milk liner of the present embodiment comprises a first portion 132 and a second portion 134. In the present embodiment, the sleeve 130 has a triangular cross section, as illustrated in FIGS. 3, 6 and 7. FIG. 6 illustrates a cross section of the first portion 132, while FIG. 7 illustrates a cross section of the second portion 134. Each of the first portion 132 and the second portion 134 are tapered towards the proximal end or outlet pipe 120 end of the milk liner 100, and in this embodiment the portions taper at the same rate. The taper of the first 132 or second 134 portions may be at different rates. In the present embodiment, the wall thickness of the sleeve 130 is substantially constant along a part of its length, and the inner and outer cross sections decrease at an equal rate towards the proximal end of the sleeve 130 to form the taper. In other embodiments, the wall may narrow or thin towards the proximal end of the sleeve 130, for example, with the outer cross section tapering at a greater rate than the inner cross section.

A triangular cross section for the sleeve 130 is advantageous for milking efficiency. As illustrated in FIG. 3, which shows the sleeve in its collapsed state, indicated by lines 131, while the sleeve 130 collapses sufficiently to close onto the teat 400, it does not pinch or overly compress the teat 400, and in particular the teat end. Furthermore, channels 133 remain at the outer extent of the collapsed sleeve 130. These can, for example, allow air from vent 116 to pass along the sleeve 130, pushing the milk away from the teat end to reduce respray from the outlet pipe 120.

Figure 8:
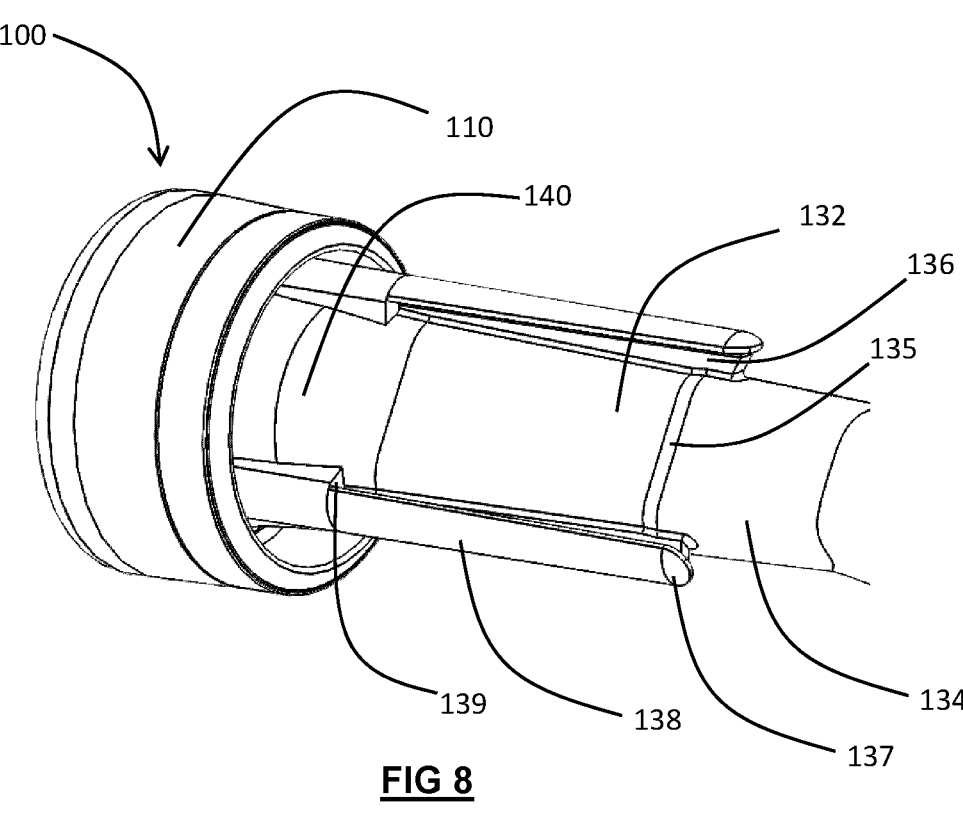
FIG. 8 illustrates a side-on rendering of the milk liner, indicating the shape of the ribs.
Figure 9:
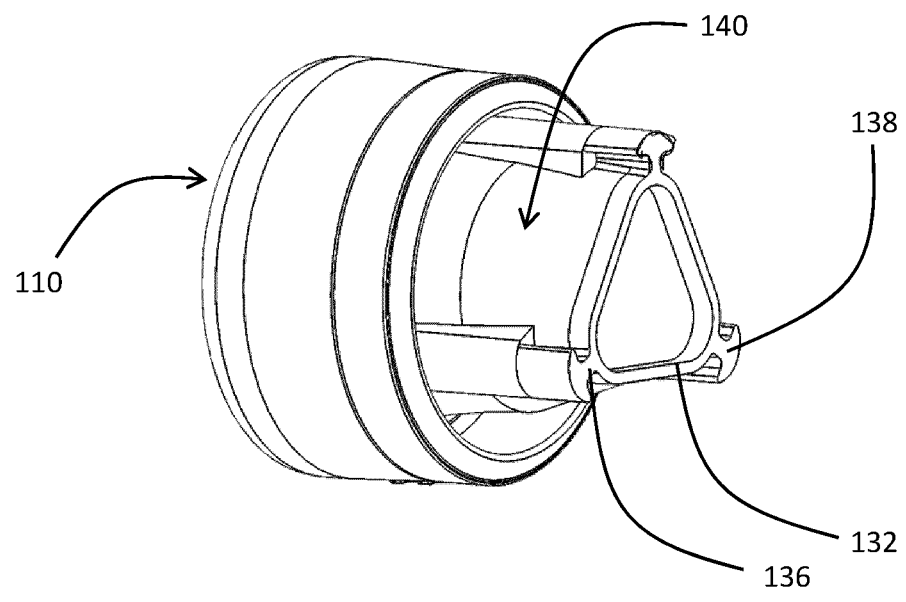
FIG. 9 shows a cut-through detail of the milk liner, indicating the shape of the ribs at a distal end.
Figure 10:
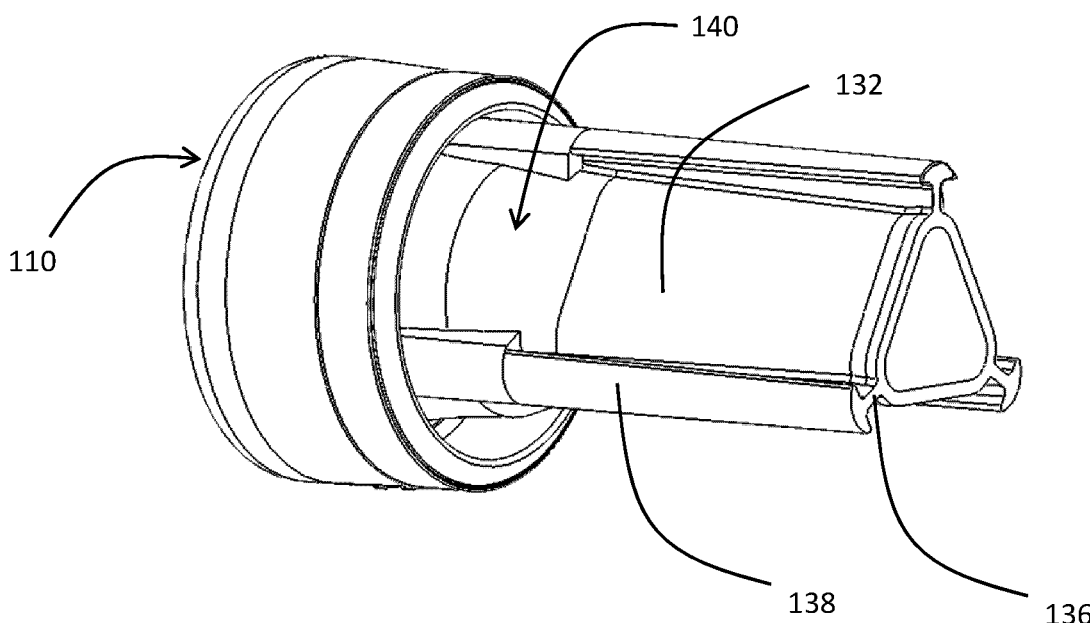
FIG. 10 shows a cut-through detail of the milk liner, indicating the shape of the ribs at a proximal end.

As seen more particularly on FIG. 6, the first portion 132 includes a plurality of outwardly extending ribs 136, while as seen more particularly on FIG. 7 the second portion 134 is unribbed. The ribs 136 therefore terminate at a proximal end of the first portion 132. As seen more particularly on FIG. 8, the ribs 136 may longitudinally terminate in a rounded end 137 for ease of mounting in the shell 200. The ribs 136 extend outward from each of the vertices of the triangular sleeve, and terminate out an outer end in a flange 138 for engaging with the shell 200. Where the sleeve 130 has a different cross sectional shape, such as a polygon with a different number of sides, a different number of ribs 136 may be provided. The ribs 136 may extend from the sides of the sleeve 130 rather than, as shown in FIG. 6, from the vertices or corners. In some embodiments, the sleeve 130 may be circular, and the ribs 136 may be positioned around the circular sleeve 130 to effect a desired collapse shape. For example, three equally spaced ribs 136 around a circular sleeve 130 can enable a triangular collapse. The illustrated flanges 138 are a T-shaped flange, with a cross bar extending across the end of the rib 136. In other embodiments, different forms of flange 138 may be used. The ribs 136 narrow in width and increase in outward extent or transverse extent towards the proximal end of the sleeve 130. This is illustrated in FIGS. 8, 9 and 10.

The function of the ribs 136 is to provide an outward or transverse tension on the sleeve 130, and to thereby control, regulate, resist or reduce the level of collapse. A longer or narrower rib 136 provides a lower level of support, and hence a variation of rib dimensions along the rib can lead to a progressive change in cross tension, and readiness to collapse. Providing ribs 136 on the liner 100 also enables a thinner wall of the liner to be used for the same level of collapse. A thinner wall may be preferable, as it can react more quickly to changes in pressure across the wall. Therefore, the use of ribs 136 enables a more reactive liner without leading to higher pressure or stress on the teat 400. In other words, the touch-point pressure may be maintained or even raised while still allowing for a more reactive liner.

The second portion 134, which is unribbed, may have a thicker wall than the first portion 132. This can partially compensate for the lack of support from ribs, leading to a section or portion that can collapse more readily than the ribbed portion, while still not being affected by pressure below a threshold value. For example, the wall may be thicker by 10-40%, and in the present embodiment by about 20%. The change in wall thickness may be a step change, and may occur at an interface 135. At the interface 135, the step change may be outwards from the sleeve 130 to maintain a smooth inner surface. The interface 135 may be located within the first portion 132, and within the longitudinal extent of the ribs 136 to reduce any end effects on the level of cross tension from the end of the ribs. For example, the interface 135 may be positioned distally of the proximal end of the first portion 132. In an embodiment, the interface 135 may be positioned between about 1 mm and about 20 mm (preferably about 3 mm to about 10 mm) from the proximal end of the first portion 132. In some embodiments, the second portion 134 may have a thinner wall than the first portion 132, where this is necessary to further ensure the collapse of the second portion 134.

The combined effect of the tapering cross section, and of the location and form of the ribs 136 is to generate a varying level of transverse or cross tension along the sleeve 130. In this way, when a pressure difference is created across the wall of the sleeve 130, the result is a progressive collapse towards the distal end of the sleeve 130, providing a peristaltic massage of the teat 400. In other words, the liner closes progressively onto and up the teat 400. This massage achieves a number of functions. Firstly, since the closing or collapse of the sleeve is progressive, the sleeve 130 can automatically adjust to teats of different lengths, or for teat movement during milking. The progressive collapse of the sleeve 130 causes the liner to collapse onto the teat end regardless of where the teat end is located along the sleeve 130. Furthermore, the peristaltic massage of the teat can assist in preventing blood and fluids from pooling close to the teat end. This therefore reduces stress on the teat tissue, improving animal health, and improving milking efficiency.

The features can be combined in different ways to achieve the same effect. Therefore, in some embodiments of the invention, the sleeve 130 may have a ribbed portion and an unribbed portion, but not have a tapering cross section. In some embodiments, no ribs are present, and the progressively varying cross tension is caused by the tapering of the sleeve 130. The ribs 136 may instead have a constant cross section rather than lengthening and/or narrowing towards a proximal end of the sleeve 130. By configuring the sleeve 130 to have an appropriate combination of these features, the peristaltic massage effect of the sleeve 130 may be controlled and optimised as required for the particular animal to be milked and/or according to the operating parameters of the milking apparatus.

Figure 4:
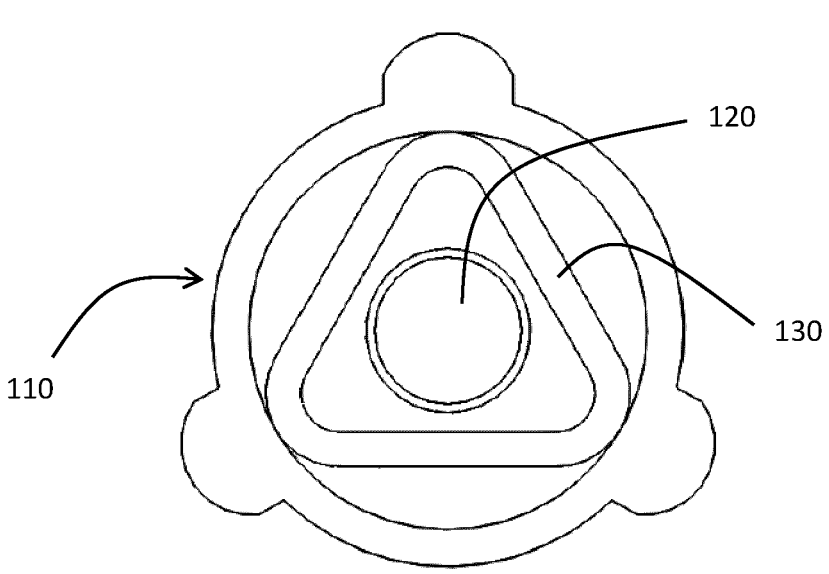
FIG. 4 illustrates a top down view of the mouthpiece of the milk liner, along line A-A of FIG. 1.
Figure 5:
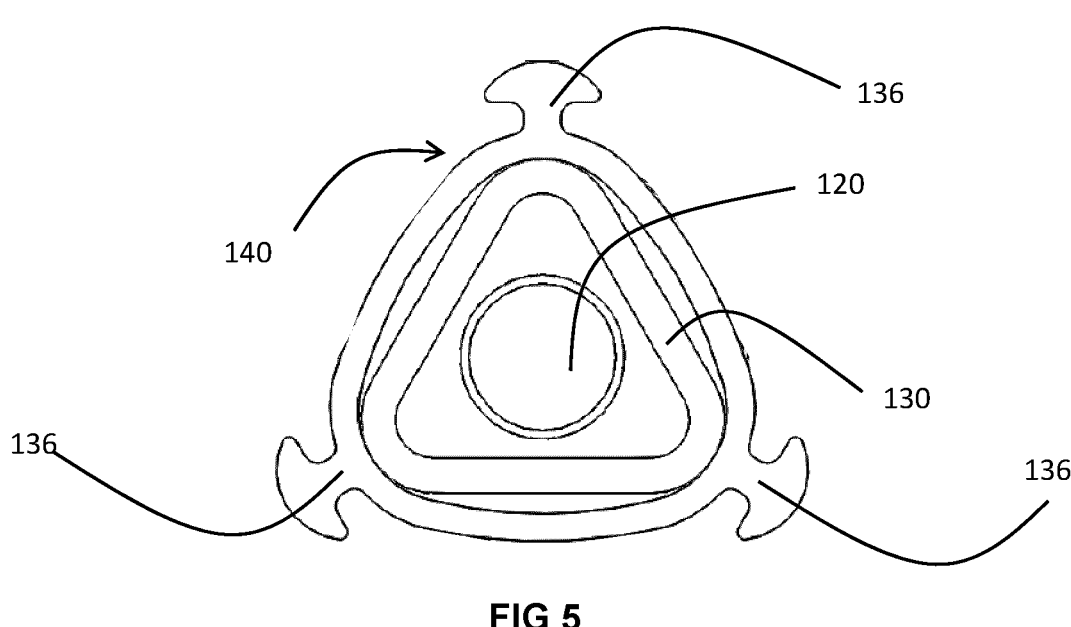
FIG. 5 illustrates a top down view of the mouthpiece transition portion of the milk liner, along line B-B of FIG. 1.

The mouthpiece transition portion 140 is located between the sleeve 130 and the mouthpiece 110. The cross sectional shape of the mouthpiece transition portion changes gradually and progressively from that of the mouthpiece 110 to that of the sleeve 130. In the illustrated embodiment, the mouthpiece is circular, while the sleeve 130 is triangular. The mouthpiece transition portion 140 therefore transitions from circular to triangular along its length. This is shown in FIGS. 4 and 5. The mouthpiece transition portion 140 fulfils two functions in this way. Firstly, it improves the guiding of the teat 400 into the sleeve 130 by providing a smooth inner surface having a gradually changing shape, rather than a step change in shape. Secondly, it creates an additional volume within the liner 100 compared to a continuation of the sleeve 130. When the teat 400 is massaged by the sleeve, this can push the teat 400 upwards, or towards the distal end of the liner 100. The mouthpiece transition portion 140 and the mouthpiece 110 can therefore provide an expansion volume into which the teat 400 may expand. This therefore reduces the level of constriction on the teat 400, which can enable faster milking. The ribs 136 of the first portion 132 may continue at least part of the way along the mouthpiece transition portion 140. In some embodiments, the mouthpiece transition portion 140 may be omitted, and the sleeve 130 may instead connect directly to the mouthpiece 110 with a step change in shape rather than the gradual transition provided by the mouthpiece transition portion 140.

The outlet transition portion 150 is located between the sleeve 130 and the outlet pipe 120. As with the mouthpiece transition portion 140, the outlet transition portion 150 provides a smooth and gradual change of shape from that of the sleeve 130 to that of the outlet pipe 120. The outlet pipe 120 is typically circular. The outlet transition portion 150 therefore presents a smooth inner surface of the liner 100 to avoid projections or obstructions which could otherwise obstruct or affect milk flow to the outlet pipe 120. In some embodiments, the outlet transition portion may be omitted, and the sleeve 130 may connect directly to the outlet pipe 120.

Figure 13:
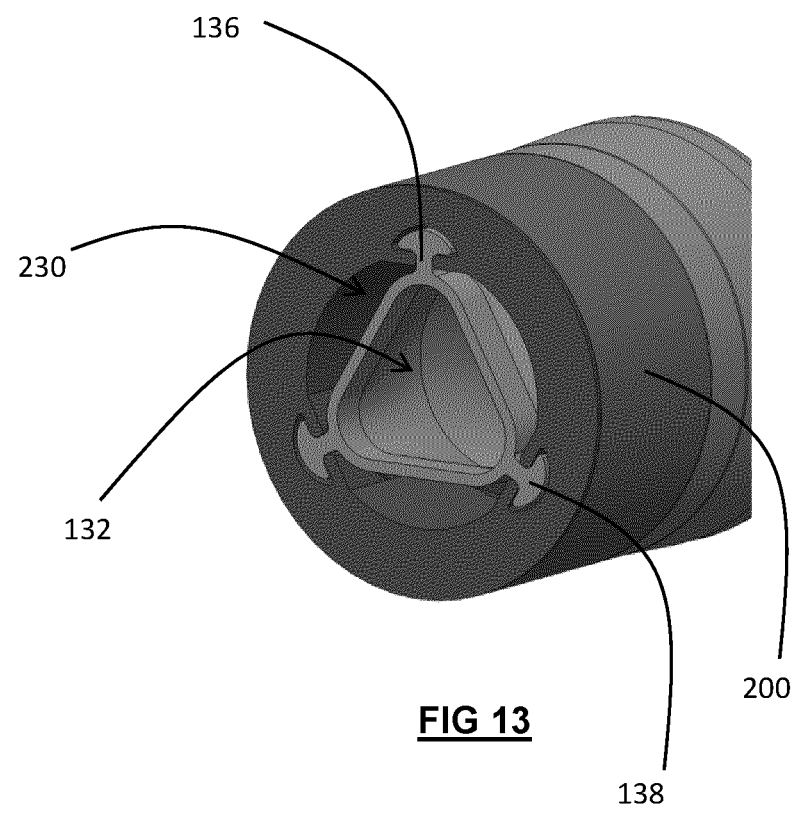
FIG. 13 shows a cut through view of a distal end of a teat cup.
Figure 14:
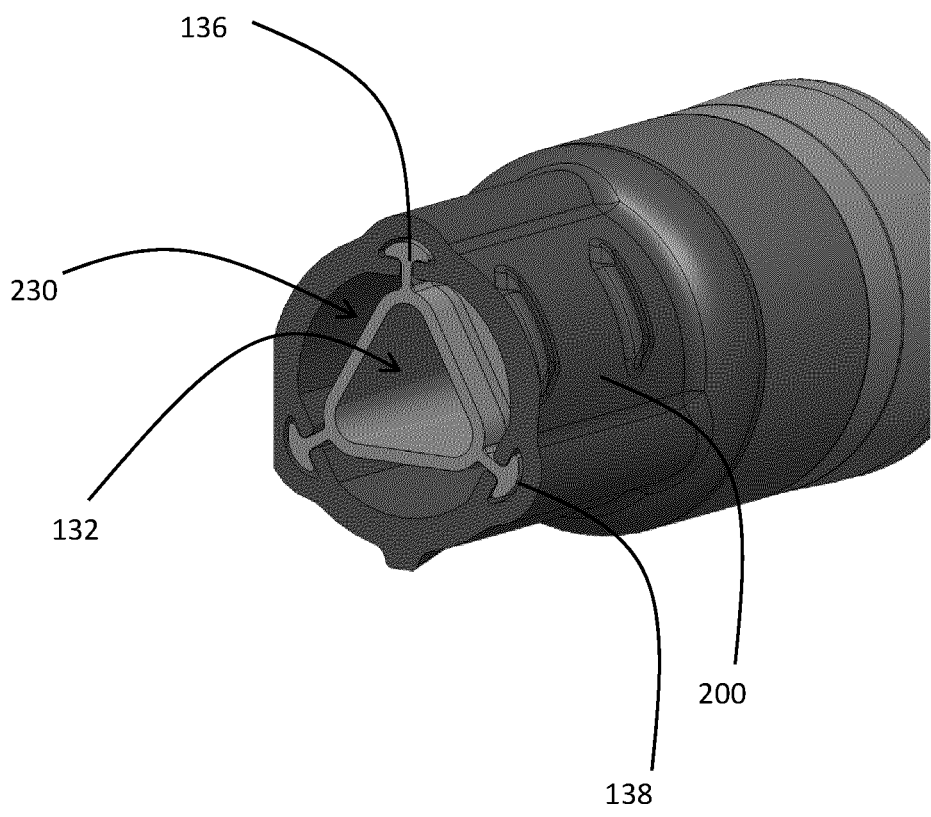
FIG. 14 shows a cut through view of a proximal end of a teat cup.

In order to be used with a milking apparatus, the liner 100 is mounted to a shell 200, which may be a rigid shell, as illustrated in FIGS. 11 and 12, forming a teat cup. The shell 200 is cup shaped. The wall thickness of the shell 200 may narrow towards a proximal end of the shell, as illustrated in FIGS. 13 and 14. The rim 210 of the shell 200 is placed underneath the skirt 118 of the liner 100 (e.g. within the pocket defined by the skirt 118), and the outlet pipe 120 is drawn through an aperture or hole in the base of the shell until it is locked in place by the flange 122. The rim 210 of the shell 200 engages with the underside of the skirt 118, the latter forming a stop surface 119 or mounting point for the liner 100 on the shell 200. The rim 210 and base of the shell are spaced such that a longitudinal stretch is imposed on the liner 100 when the teat cup is assembled. The longitudinal stretch places a tension on the walls of the liner 100. This tension aids the walls in returning or rebounding to their relaxed or open state when the pressure difference is removed, that is, when the pressure difference falls below the predetermined operational range. The longitudinal strain is preferably greater than 10%, more preferably greater than 12%, or 15%.

The flange 122 and skirt 118 also form an airtight seal between the liner 100 and the shell 200. A sealed chamber 230 is thereby formed between the shell 200 and the liner 100. The shell 200 comprises a vent or pipe 232 which is connected to this chamber 230, and which can be used to supply or remove air, gas, fluid or liquid from the chamber 230. This pipe 232 therefore enables the pressure in the chamber 230 to be varied, which, in turn, varies the pressure difference across the wall of the liner 100. In use, a periodic or cyclical pressure is applied to the chamber 230 via the pipe 232, to cause a regular or repeating collapse of the liner 100 and hence a peristaltic massage of the teat 400. The chamber 230 may be referred to as a pulsation chamber.

The ribs 136 of the liner are received in corresponding slots 236 of the shell 200. The slots 236 have a cooperating or corresponding shape to the flanges 138 of the ribs 136, and engage with the flanges 138 to hold the ribs 136 in place. Therefore, by engaging with the slots 236, the ribs 136 can provide the requisite support to the sleeve 130. The slots 236 may be arranged such that an amount of transverse tension is applied to the ribs 136 even at rest, or when no suction or pressure is applied to the liner 100. This tension may be, for example, between 0% and 50%.

The shell 200 may further comprise an auxiliary module (not illustrated). For example, the auxiliary module may be mountable to the shell 200, or may be an integral component of the shell 200. The auxiliary module may provide additional functionality to the teat cup. In an example, the auxiliary module may include a sensor configured to capture information about the internal volume of the liner 100, e.g. by measuring one or more properties of the internal volume. Such information may include, for example, the temperature, pressure, humidity, position, or contact force between the liner and the teat 400. The sensor may be, for example, a probe or an array of probes which extend through the liner 100 into the internal volume. An array of probes can be arranged to capture the information along the whole length of the inner barrel. This may be useful for comparing properties at different positions, e.g. at the tip of the teat compared with elsewhere.

In another example, the auxiliary module may comprise a camera configured to capture an image of the internal volume.

In a further example, the auxiliary module may be configured to selectively permit fluid communication between the internal volume of the liner and an environment outside the teat cup. This arrangement may be used instead of or in addition to the vent 116 in the mouthpiece 110.

In yet a further example, the auxiliary module may comprise a fluid delivery mechanism for injecting or otherwise directing a sanitisation fluid (e.g. iodine) onto the teat 400, e.g. when the milking process is complete.

Any combination of the above examples of functions for the auxiliary module may be provided in the same unit.

Figure 15:
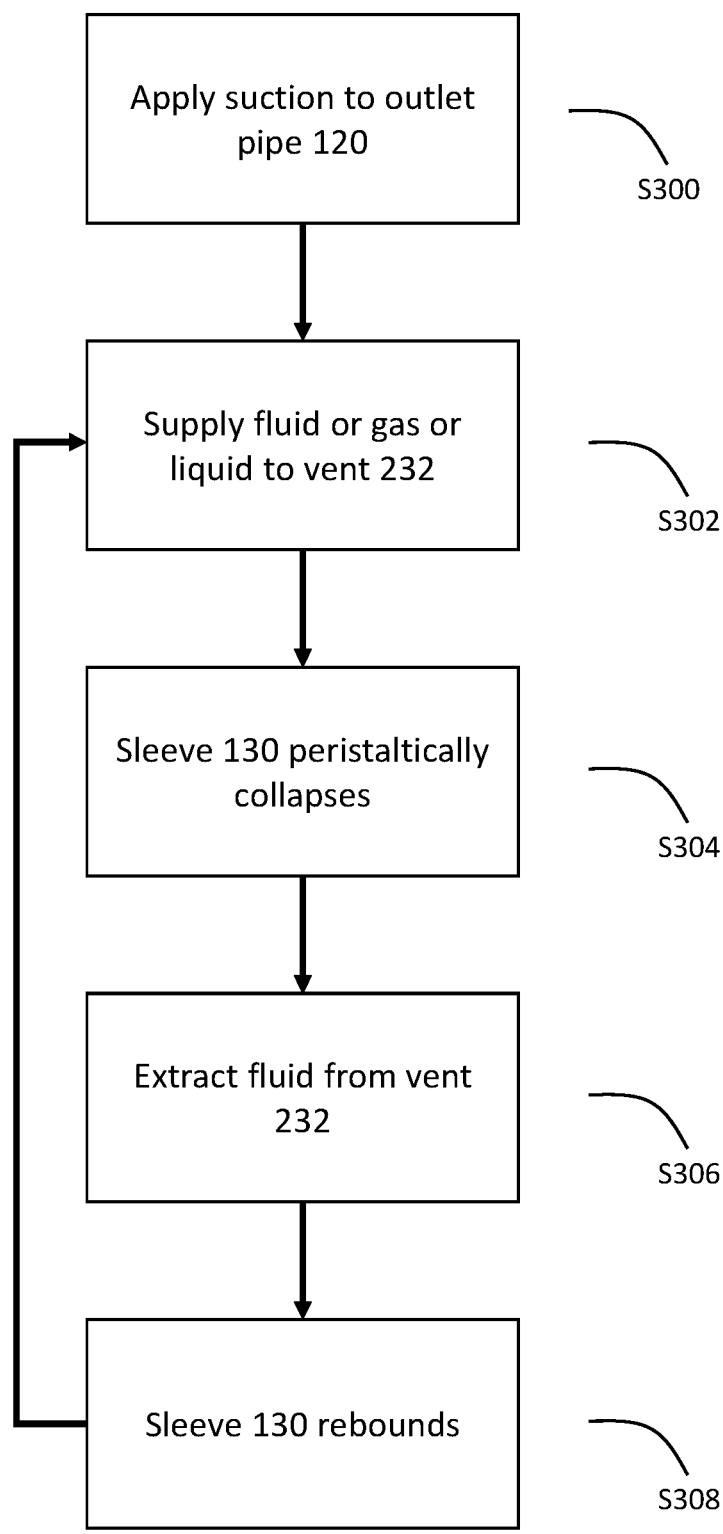
FIG. 15 shows a flow chart for a method of operating a milking apparatus.

A teat cup, or more typically a set of teat cups forming a milking cluster may form part of a milking apparatus. The milking apparatus comprises means such as one or more pumps for generating suction on the outlet pipe 120, and for supplying or removing air from the chamber 230 via pipe 232, in addition to control systems for the pumps. In use, the teat cups may be placed on the teats 400 of an animal to be milked. The milking process is indicated schematically in FIG. 15. In step S300, suction is applied to the outlet pipe 120 to extract milk. In other words, a reduced pressure is generated within the outlet pipe 120 and sleeve 130. In steps S302-S308, a varying or pulsing or cycling or periodic pressure is applied to the chamber 230 via pipe 232, causing a pressure difference across the wall of the liner 100 to effect a peristaltic massage of the teat 400. The cyclical pressure variation may be, for example, a step change between two pressure values (i.e. a square wave pressure profile), or a ramped change such as a sawtooth or sinusoidal wave. Steps S302-S308 are repeated for at least a part of the milking process.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

What is claimed is:

1. A milk liner for use in a shell of a milking apparatus, the milk liner comprising:
   a resiliently deformable sleeve extending between a mouthpiece at a distal end and an outlet pipe at a proximal end, the sleeve forming a cavity for receiving a teat of an animal to be milked, wherein the sleeve comprises:
   a first portion having a plurality of ribs, the ribs extending longitudinally along and transversely outward from the first portion, the longitudinal extent of each rib terminating at a proximal end of the first portion, the transversal extent of each rib terminating in a flange for engaging with the shell; and
   a second portion located between the proximal end of the first portion and the outlet pipe;
   wherein a width of each rib decreases towards the proximal end of the first portion;
   wherein the sleeve has a distal wall portion with a first wall thickness and a proximal wall portion with a second wall thickness greater than the first wall thickness, wherein the sleeve comprises a wall thickness step change at an interface between the distal wall portion and the proximal wall portion; and wherein, when a pressure difference within a predetermined range is present across a wall of the sleeve:

the second and first portions are configured to sequentially collapse inwards;

the proximal wall portion is configured to collapse inwards; and each of the first and second portions are configured to progressively collapse inwards, the progressive inward collapse being directed towards the distal end of the sleeve, so as to cause a peristaltic massage of the teat, the peristaltic massage being directed up the teat.

2. A milk liner according to claim 1, wherein the ribs and the sleeve are configured to generate a progressively increasing transverse tension towards the distal end of the sleeve when mounted in the shell of the milking apparatus to thereby effect the progressive collapse of the first and second portions.

3. A milk liner according to claim 1, wherein:

the transversal extent of each rib increases towards the proximal end of the first portion.

4. A milk liner according to claim 1, wherein the first portion tapers towards a proximal end of said first portion.

5. A milk liner according to claim 1, wherein the first portion of the sleeve has a triangular cross sectional shape.

6. A milk liner according to claim 1, wherein:

a cross sectional shape of the outlet pipe is different to a cross sectional shape of the second portion, and wherein the sleeve further comprises:

an outlet transition portion located between a proximal end of the second portion and the outlet pipe, the outlet transition portion having a gradual transition of cross sectional shape between the cross sectional shape of the second portion and the cross sectional shape of the outlet pipe.

7. A milk liner according to claim 1, wherein a cross sectional shape of the mouthpiece is different to a cross sectional shape of the first portion, and wherein the sleeve further comprises:

a mouthpiece transition portion located between the mouthpiece and a distal end of the first portion, the mouthpiece transition portion having a gradual transition of cross sectional shape between the cross sectional shape of the mouthpiece and the cross sectional shape of the first portion.

8. A milk liner according to claim 1 wherein:

a cross sectional shape of the outlet pipe is different to a cross sectional shape of an unribbed portion, wherein the second portion is the unribbed portion, and wherein the sleeve further comprises:

an outlet transition portion located between a proximal end of the unribbed portion and the outlet pipe, the outlet transition portion having a gradual transition of cross sectional shape between the cross sectional shape of the unribbed portion and the cross sectional shape of the outlet pipe.

9. A milk liner according to claim 1 wherein the mouthpiece transition portion defines an expansion volume into which the teat may expand while undergoing the peristaltic massage.

10. A milk liner according to claim 1, further comprising:

a vent located in a sidewall of the mouthpiece for admitting ambient air into the cavity of the sleeve.

11. A teat cup of a milking apparatus, the teat cup comprising:

a cup-shaped shell, and a milk liner according to claim 1, the milk liner being mounted to the shell to define an air-tight chamber between the milk liner and the shell, wherein the shell comprises a vent in fluid communication with the chamber.

12. A teat cup according to claim 11, wherein the milk liner is mounted to each of a rim of the shell and a base of the shell, and wherein the shell is sized to impose a longitudinal stretch on the mounted milk liner.

13. A teat cup according to claim 11 wherein:

the sleeve of the milk liner comprises a plurality of transversally outward extending ribs, the transversal extent of each rib terminating in a flange, and wherein:

the shell comprises corresponding slots for receiving and engaging with the flanges.

14. A milking apparatus comprising:

a teat cup according to claim 11, a suction source for applying a suction force to the outlet pipe of the milk liner, and a pressure source for applying a cyclically varying pressure to the vent of the shell.

15. A milk liner for use in a shell of a milking apparatus, the milk liner comprising:

a resiliently deformable sleeve extending between a mouthpiece at a distal end and an outlet pipe at a proximal end, the sleeve forming a cavity for receiving a teat of an animal to be milked, wherein the sleeve comprises:

a first portion having a plurality of ribs, the ribs extending longitudinally along and transversally outward from the first portion, the longitudinal extent of each rib terminating at a proximal end of the first portion, the transversal extent of each rib terminating in a flange for engaging with the shell; and a second portion located between the proximal end of the first portion and the outlet pipe;

wherein the second and first portions are configured to sequentially collapse inwards, and wherein each of the first and second portions are configured to progressively collapse inwards, the progressive inward collapse being directed towards the distal end of the sleeve when a pressure difference within a predetermined range is present across a wall of the sleeve, so as to cause a peristaltic massage of the teat, the peristaltic massage being directed up the teat;

wherein a width of each rib decreases towards the proximal end of the first portion;

wherein the sleeve has a distal wall portion with a first wall thickness and a proximal wall portion with a second wall thickness greater than the first wall thickness;

wherein the sleeve comprises a wall thickness step change at an interface between the distal wall portion and the proximal wall portion; and wherein the milk liner is configured to engage a base of the shell at a location on the milk liner between a proximal end of the proximal wall portion and the outlet pipe.

* * * * *